(12) United States Patent
Xu et al.

(10) Patent No.: US 7,310,223 B2
(45) Date of Patent: Dec. 18, 2007

(54) ELECTRICAL CONNECTOR DEVICE FOR A DISC DRIVE

(75) Inventors: Mo Xu, Singapore (SG); Joseph HengTung Lau, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 39 days.

(21) Appl. No.: 11/298,878

(22) Filed: Dec. 9, 2005

(65) Prior Publication Data

US 2007/0133164 A1 Jun. 14, 2007

(51) Int. Cl.
*G06F 1/16* (2006.01)

(52) U.S. Cl. ............... 361/685; 360/97.01; 174/384; 720/600

(58) Field of Classification Search ............... 174/382, 174/384; 360/97.01, 97.02, 99.01; 369/30.63; 720/600; 361/679–687, 724–727
See application file for complete search history.

(56) References Cited

U.S. PATENT DOCUMENTS

| 6,034,841 | A | 3/2000 | Albrecht et al. ......... 360/97.01 |
| 6,137,759 | A | 10/2000 | Ogiro et al. ............... 369/75.2 |
| 6,186,824 | B1 * | 2/2001 | Lee ............................. 439/500 |
| 6,278,574 | B1 | 8/2001 | Wakita et al. ........... 360/99.01 |
| 6,426,847 | B1 | 7/2002 | Dague et al. ............ 360/97.01 |
| 6,545,865 | B2 | 4/2003 | Albrecht et al. ............ 361/685 |
| 6,704,161 | B1 | 3/2004 | Pham et al. ............. 360/97.02 |
| 6,735,043 | B2 | 5/2004 | Bernett et al. ........... 360/97.01 |
| 6,826,018 | B2 | 11/2004 | Kuwajima et al. ....... 360/254.3 |
| 6,873,524 | B2 * | 3/2005 | Kaczeus et al. ............ 361/685 |
| 7,087,835 | B2 * | 8/2006 | Ziberna ...................... 174/384 |
| 2002/0163754 | A1 * | 11/2002 | Dague et al. ............ 360/97.01 |
| 2003/0011980 | A1 | 1/2003 | Albrecht et al. ............ 361/685 |
| 2003/0026037 | A1 | 2/2003 | O'Sullivan et al. ...... 360/97.01 |
| 2004/0076103 | A1 | 4/2004 | Drouin ...................... 369/75.1 |
| 2004/0081054 | A1 | 4/2004 | Nguyen .................... 369/75.1 |
| 2004/0213095 | A1 | 10/2004 | Volk et al. .............. 369/30.63 |
| 2005/0046996 | A1 | 3/2005 | Kimura et al. .......... 360/97.01 |
| 2005/0225950 | A1 * | 10/2005 | Matsuda et al. ............ 361/737 |

FOREIGN PATENT DOCUMENTS

WO WO 00/74049 7/2000

* cited by examiner

*Primary Examiner*—Hung Van Duong
(74) *Attorney, Agent, or Firm*—Leanne Taveggia Farrell Westman, Champlin & Kelly, P.A.

(57) ABSTRACT

An electrical connector device for an enclosure is provided. The electrical connector device includes an outer frame that is configured to at least partially surround an enclosure. The outer frame includes a plurality of mutually coupled sidewalls. The outer frame also includes an inner surface for coupling adjacent to the enclosure. An electrical connector body is included with one of the plurality of sidewalls of the outer frame.

19 Claims, 9 Drawing Sheets

ELECTRICAL CONNECTOR DEVICE FOR A DISC DRIVE

FIELD OF THE INVENTION

The present invention relates generally to a data storage system, and more particularly but not by limitation to a data storage system having a CF compatible interface.

BACKGROUND OF THE INVENTION

Disc drives are typical data storage systems and are commonly used in work stations, personal computers, portable computers and other computing systems to store large amounts of data in a form that can be readily available to a user. A disc drive includes a head disc assembly that is attached to a printed circuit board assembly. The head disc assembly includes a variety of components. The components include one or more discs having data surfaces that are coated with a magnetizable medium for storage of digital information in a plurality of circular, concentric data tracks. The disc(s) are mounted on a spindle motor that causes the disc(s) to spin and the data surfaces of the disc(s) to pass under respective aerodynamic bearing disc head sliders. The sliders carry magnetic transducers, which write information to and read information from the data surfaces of the discs.

With the rapid increase in a real density of the magnetizable medium, continued demand exists for disc drives having smaller sizes. A disc drive can be as small as a one-inch drive or smaller. A one-inch drive can be formed in accordance with CompactFlash® (CF) Type II specifications adopted by the CompactFlash Association (CFA) as an industry standard. There is also an increasing demand for one-inch drives that do not meet CF specifications and have a smaller size than the size specified by the CF specifications (i.e. sizes that are at least 20% smaller than CF specifications in terms of drive overall volume).

By forming a one-inch drive in accordance with CF Type II specifications, one-inch disc drives can be removably installed in various handheld or portable devices that demand large storage capacities and include CF Type II receiving slots, such as computing machines (e.g. personal data assistants), communication devices (e.g. cell phones), audio devices (e.g. digital music players), video recorders (e.g. digital cameras) and other small consumer applications. In these various example consumer products that include CF Type II receiving slots, it is desirable to use a one-inch drive compared to a CompactFlash® card because the one-inch drive has a larger data storage capacity. To form a one-inch disc drive that is compatible with CF Type II slots, the one-inch drive needs to include a CF compatible interface. Compatible CF interfaces include mounting features for insertion into a CF Type II receiving slot as well as a compatible electrical connector.

One way to meet the increasing demands for CF type one-inch disc drives and non-CF type one-inch disc drives is to design different sized head disc assemblies. Such an endeavor, however, would be resource and time consuming as well as tedious. It is desirable to design a single sized head disc assembly that can be adapted to meet the demands for both CF type one-inch disc drives and non-CF type one-inch disc drives.

Adapting a single sized head disc assembly to be a CF compatible one-inch disc drive presents many challenges. In general, adapting a single sized head disc assembly requires many additional installation processes and part components, such as mounting screws. A CF mounting slot would have to be installed onto a head disc assembly before the installation of a printed circuit board assembly and electrical connector. Besides the increase in costs associated with the increase in labor, time and component parts for adapting a head disc assembly to be a CF compatible one-inch disc drive, there is also a potential for alignment problems between different part components of the CF compatible one-inch drive.

Embodiments of the present invention provide solutions to these and other problems, and offer other advantages over the prior art.

SUMMARY OF THE INVENTION

The present invention generally relates to an electrical connector device for a data storage system. The data storage system includes an enclosure commonly referred to as a head disc assembly and a printed circuit board assembly coupled to the head disc assembly. The electrical connector device includes an outer frame configured to mate with a CompactFlash® Type slot receiver and having a plurality of mutually coupled sidewalls. The outer frame includes an inner surface configured for coupling adjacent to the enclosure. The electrical connector device also includes an electrical connector body included in one of the plurality of sidewalls. The electrical connector body provides communication between the enclosure and a host device in which the slot receiver resides.

Other features and benefits that characterize embodiments of the present invention will be apparent upon reading the following detailed description and review of the associated drawings.

DETAILED DESCRIPTION OF ILLUSTRATIVE EMBODIMENTS

The present invention includes an electrical connector device that provides an outer frame for at least partially surrounding a head disc assembly (HDA). The HDA includes an enclosure for surrounding a plurality of internal components. The HDA can be of a small size and is coupled to a printed circuit board (PCBA), which has a corresponding small size. In one embodiment, the outer frame includes features that allow the HDA and the PCBA to be compatible for mating with a CompactFlash® (CF) Type receiver slot. However, the outer frame of the present invention is not limited to conforming to CF Type specifications. In another embodiment, the outer frame can be used in connection with other head disc assemblies having various sizes. In this embodiment, the outer frame includes features that protect the enclosure or HDA and the PCBA from a vibration or shock event.

The following description of disclosed embodiments allows a HDA to be used in connection with a disc drive that conforms to CompactFlash® (CF) Type II specifications as well as to be used in connection with other disc drives having various sizes. The HDA does not need to be limited to use in one-inch disc drives or disc drives that are compatible with CF Type receiver slots. It is possible to use the HDA in a 0.85-inch drive that is compatible with CF Type receiver slots. It also possible to use the HDA in a disc drive that is larger than a one-inch disc drive to produce various sized disc drives.

Figure 1:
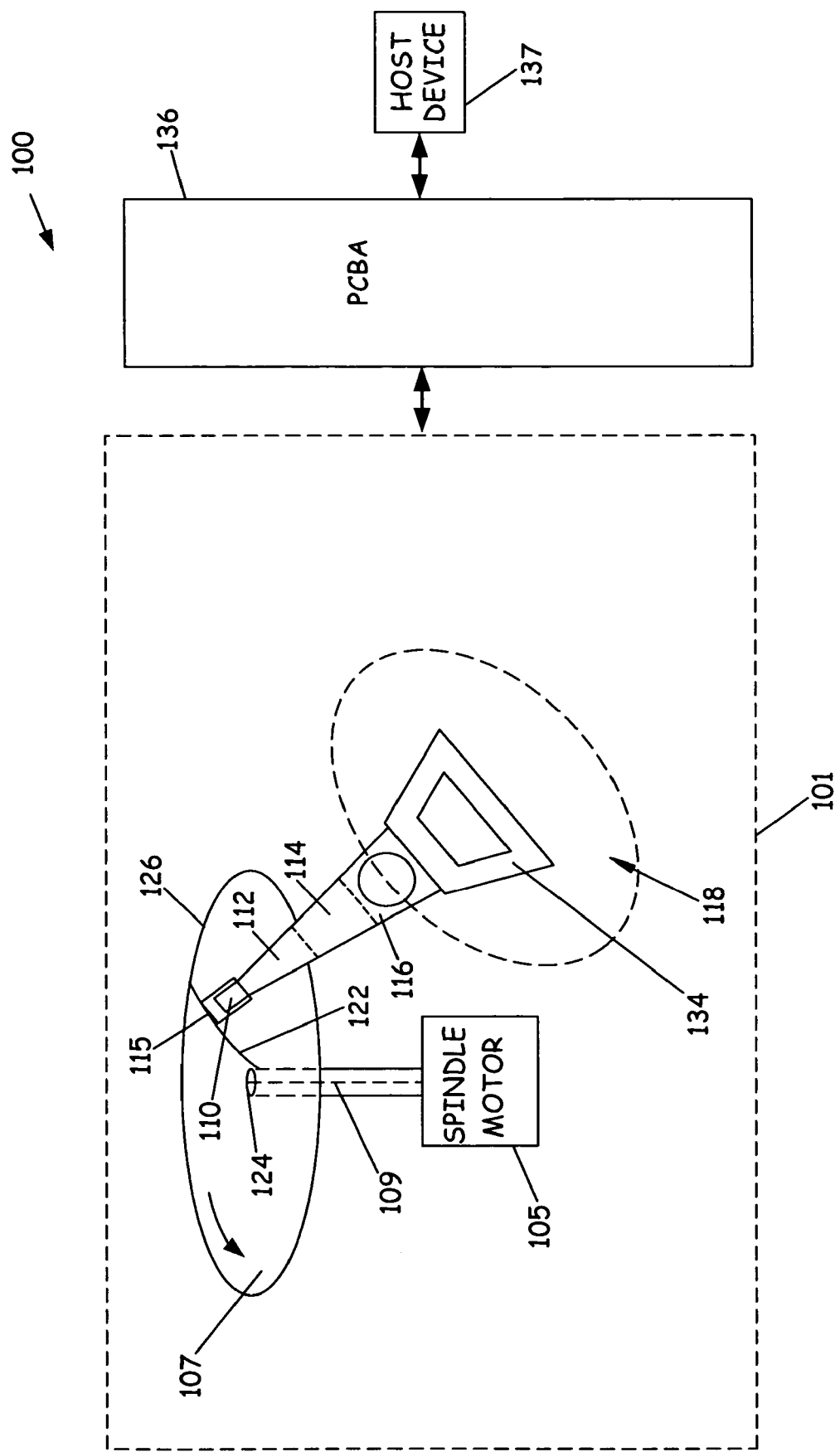
FIG. 1 illustrates a simplified schematic diagram of a data storage system.

FIG. 1 is a simplified schematic diagram of a disc drive 100 in which embodiments of the present invention are useful. Disc drives are common data storage systems. Disc drive 100 includes a hermetically sealed enclosure 101 also referred to as a head disc assembly (HDA). In general, although not illustrated in FIG. 1, enclosure or HDA 101 is defined by a base, a top cover and sidewalls. Enclosure or HDA 101 includes a disc 107. Those skilled in the art should recognize that disc drive 100 can include a single disc, as illustrated in FIG. 1, or multiple discs included in a disc pack. Disc 107 is mounted on a spindle motor 105 for rotation about central axis 109. Each disc surface has an associated slider 110. Each slider 110 carries a read/write head for communication with the surface on the disc.

Each slider 110 is supported by a suspension 112 which is in turn attached to a track accessing arm 114 of an actuator mechanism 116. Actuator mechanism 116 is rotated about a shaft by a voice coil 134 of a voice coil motor 118. As voice coil motor 118 rotates actuator mechanism 116, slider 110 moves in an arcuate path 122 between a disc inner diameter 124 and a disc outer diameter 126. While FIG. 1 illustrates one manner of actuating a data head proximate a data storage medium, the present invention, however, is applicable to data storage systems that use other techniques.

Disc drive 100 also includes a printed circuit board assembly (PCBA) 136. PCBA 136 is located outside enclosure or HDA 101. In general, PCBA 136 is mounted to an outer surface of enclosure or HDA 101. PCB 136 supports a plurality of printed circuit components (not shown in FIG. 1). The printed circuit components are configured to couple to components enclosed within enclosure or HDA 101, such as spindle motor 105, actuator mechanism 116 and voice coil motor 118, and configured to communicate with a host device 137.

Figure 2:
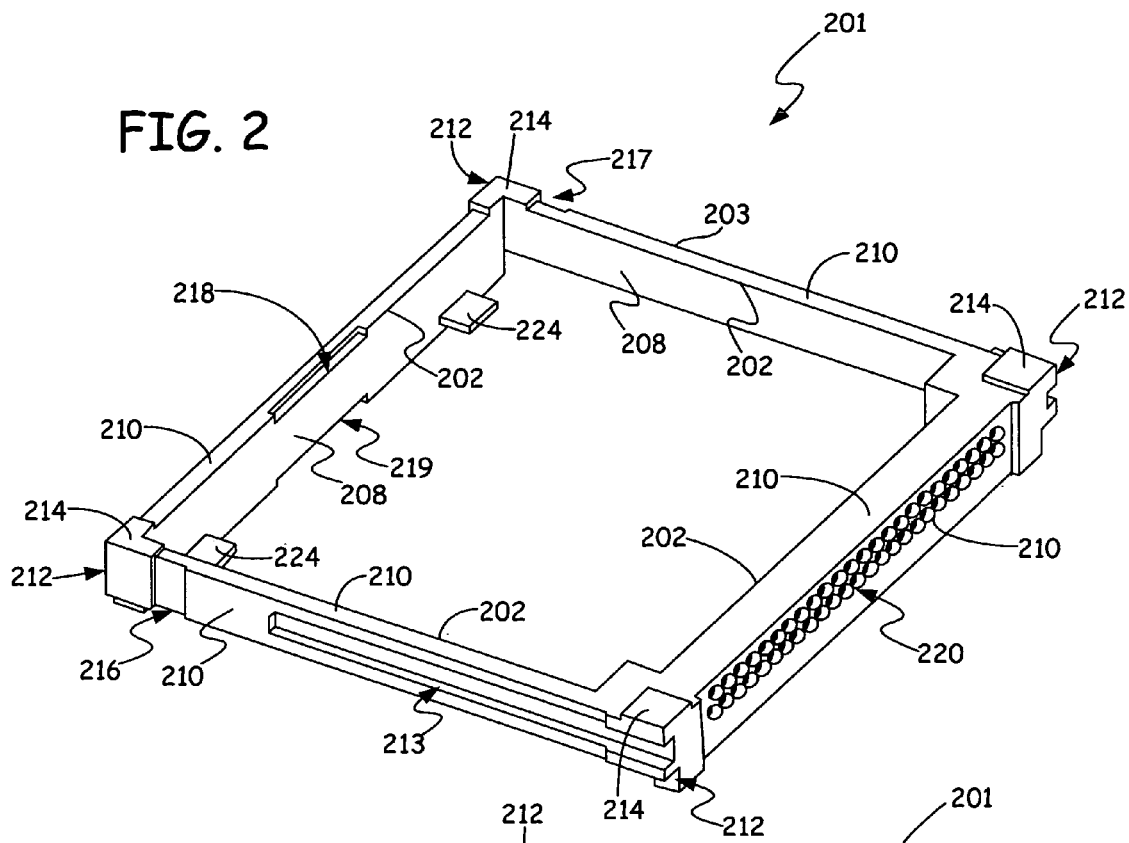
FIG. 2 illustrates a top perspective view of an embodiment of an electrical connector device for use in adapting an enclosure to be compatible with a CF Type II slot receiver.
Figure 3:
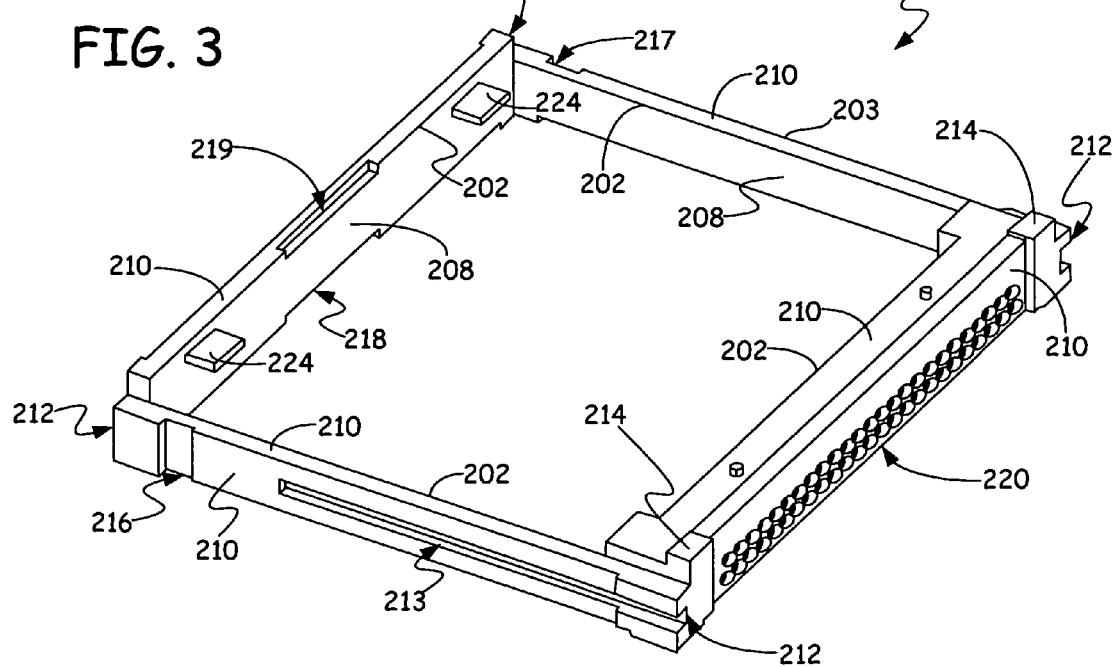
FIG. 3 illustrates a bottom perspective view of the electrical connector device illustrated in FIG. 2.

FIGS. 2 and 3 illustrate perspective views of an electrical connector device 201 for use in adapting an enclosure or HDA (not shown in FIGS. 2 and 3) to be compatible with a CF Type II slot receiver in accordance with an embodiment of the invention. FIG. 2 illustrates a top perspective view of electrical connector device 201, while FIG. 3 illustrates a bottom perspective view of electrical connector device 201. Electrical connector device 201 includes an outer frame 203. Outer frame 203 is configured to at least partially surround a small sized HDA. Outer frame 203 includes an inner surface 208 and an outer surface 210. Inner surface 208 of outer frame 203 is configured to couple adjacent to an enclosure or HDA.

Outer frame 203 also includes a plurality of mutually coupled sidewalls 202. The plurality of sidewalls 202 are mutually coupled to form four corners 212. Each of the four corners 212 includes a shock bumper 214. Shock bumpers 214 extend outwardly from outer surface 210 of outer frame 203. Shock bumpers 214 assist in absorbing shock energy inflicted on the HDA (not shown in FIGS. 2 and 3) when the HDA is placed under stress. For example, shock bumpers 214 can absorb shock energy when the HDA is dropped or placed under vibration.

Two of the sidewalls 202 include slot features 213 (one which is hidden from view in FIGS. 2 and 3). Slot features 213 are formed on sidewalls 202 that are opposite from each other. Slot features 213 are configured to allow the disc drive to mate with a CF type slot receiver. The entire outer profile (or outer surface 210) of outer frame 203 is shaped to mate with a CF type slot receiver.

Outer frame 203 also includes at least one handling feature for use in inserting the disc drive into a CF type slot receiver or removing the disc drive from a CF type slot receiver. Outer frame 203 includes a pair of side finger grip features 216 and 217. A first side finger grip feature 216 is formed on outer surface 210 of one of the plurality of sidewalls 202. A second side finger grip feature 217 is formed on outer surface 210 of one of the plurality of sidewalls opposite the sidewall that includes first side finger grip feature 216. First and second side finger grip features 216 and 217 are notches or recesses into one of the sidewalls 202 from outer surface 210 towards inner surface 208. As illustrated in FIGS. 2 and 3, first and second side finger grip features 216 and 217 are formed on the same sidewalls of which slot features 213 are formed. However, those skilled in the art will recognize that first and second side finger grip features 216 and 217 can be formed on any of the mutually coupled sidewalls 202. Outer frame 203 can include any number of handling features. Outer frame 203 also includes a top finger grip feature 218 and a bottom finger grip feature 219. Top finger grip feature 218 is formed on outer surface 210 and generally at a midpoint along one of the plurality of sidewalls 202. Bottom finger grip feature 219 is formed on outer surface 206, and generally at a midpoint along the sidewall 202 that the top finger grip feature 218 is formed on. Top and bottom finger grip features 218 and 219 are notches recesses into a portion of one of the sidewalls 202. As illustrated in FIGS. 2 and 3, top and bottom finger grip features 218 and 219 can be formed on a sidewall 202 that is different than the sidewalls 202 of which first and second side finger grip features 216 and 217 are formed. However, top and bottom finger grip features 218 and 219 can be formed on any of the plurality of sidewalls 202. In addition, outer frame 203 can include any number of top and bottom finger grip features.

Outer frame 203 also includes an electrical connector body 220 that is included in one of the plurality of sidewalls 202. As illustrated in FIGS. 2 and 3, electrical connector body 220 is integrally formed with outer frame 203 and is positioned between two of the plurality of shock bumpers 214 such that it is also protected from damage during a shock or vibration event.

Outer frame 203 also includes at least one alignment feature 224. The at least one alignment feature 224 extends outwardly from inner surface 208 of outer frame 203. The at least one alignment feature 224 prevents the outer frame 203 from tilting relative to an enclosure or HDA when the disc drive is assembled. The assembly of the disc drive is described in more detail with respect to FIGS. 4-7.

Figure 4:
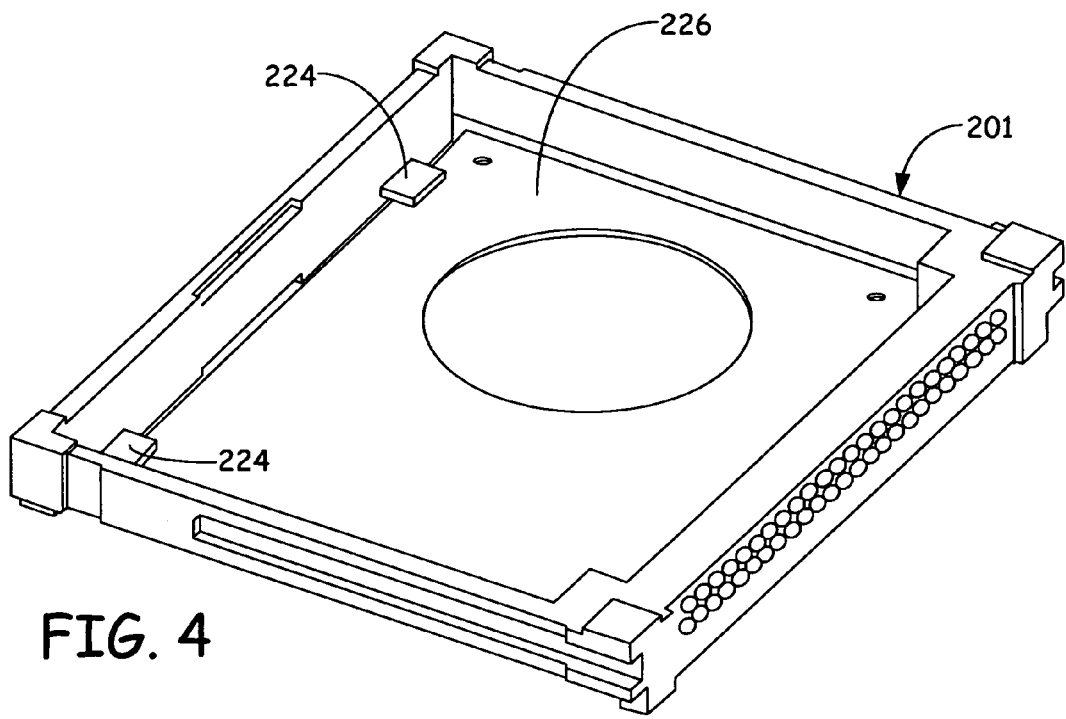
FIG. 4 illustrates a top perspective view of an embodiment of a printed circuit board assembly assembled to the electrical connector device illustrated in FIGS. 2 and 3.
Figure 5:
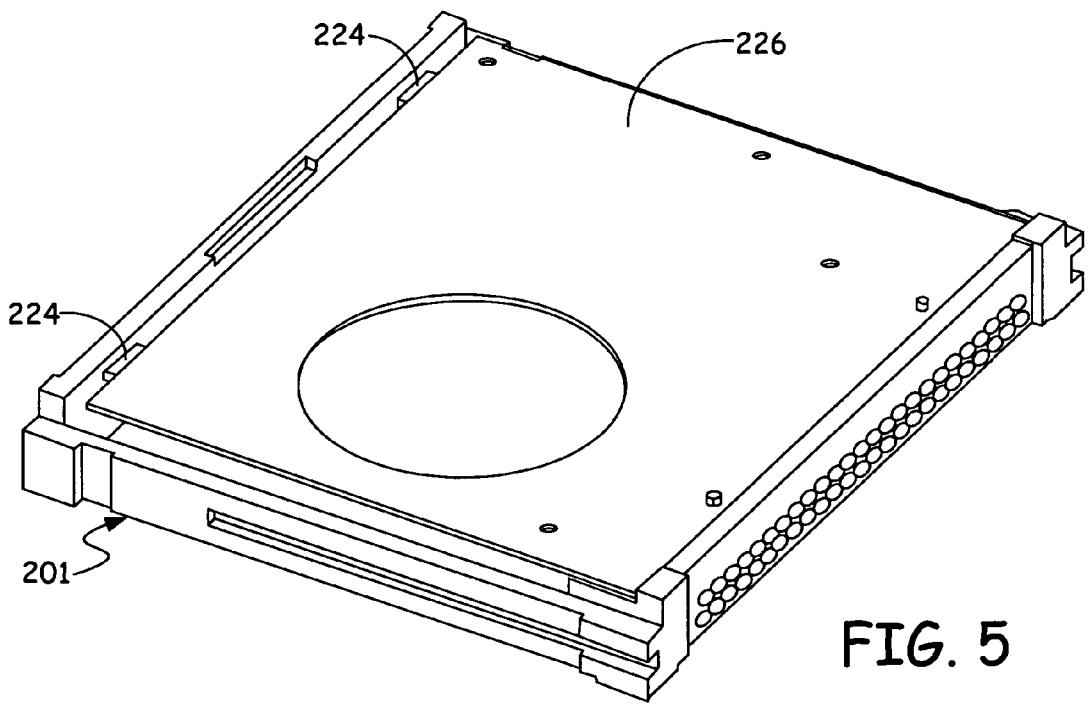
FIG. 5 illustrates a bottom perspective view of the printed circuit board assembly assembled to the electrical connector device illustrated in FIG. 4.

FIGS. 4 and 5 illustrate perspective views of a PCBA 226 assembled to outer frame 203. FIG. 4 illustrates a top perspective view of PCBA 226 assembled to outer frame 203, while FIG. 5 illustrates a bottom perspective view of PCBA 226 assembled to outer frame 203. As illustrated in both FIGS. 4 and 5, PCBA 226 is positioned below at least one alignment feature 224 and is appropriately aligned with outer frame 203.

Figure 6:
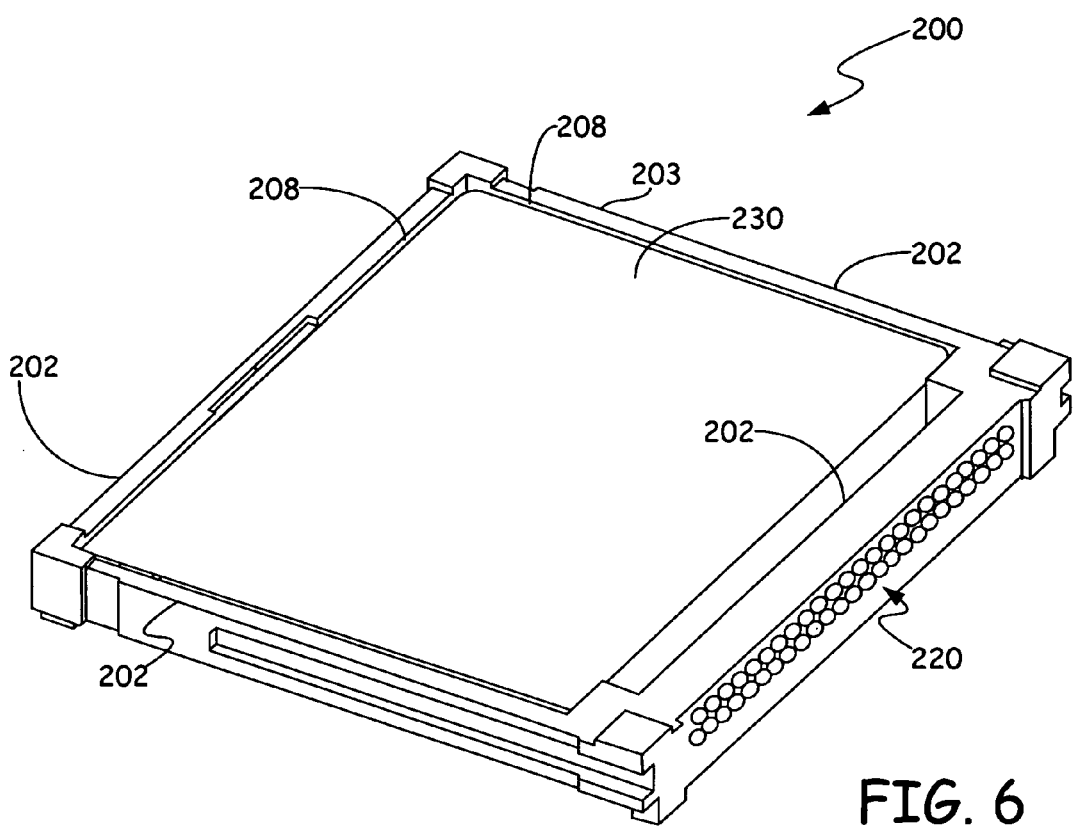
FIG. 6 illustrates a top perspective view of an embodiment of a data storage system.
Figure 7:
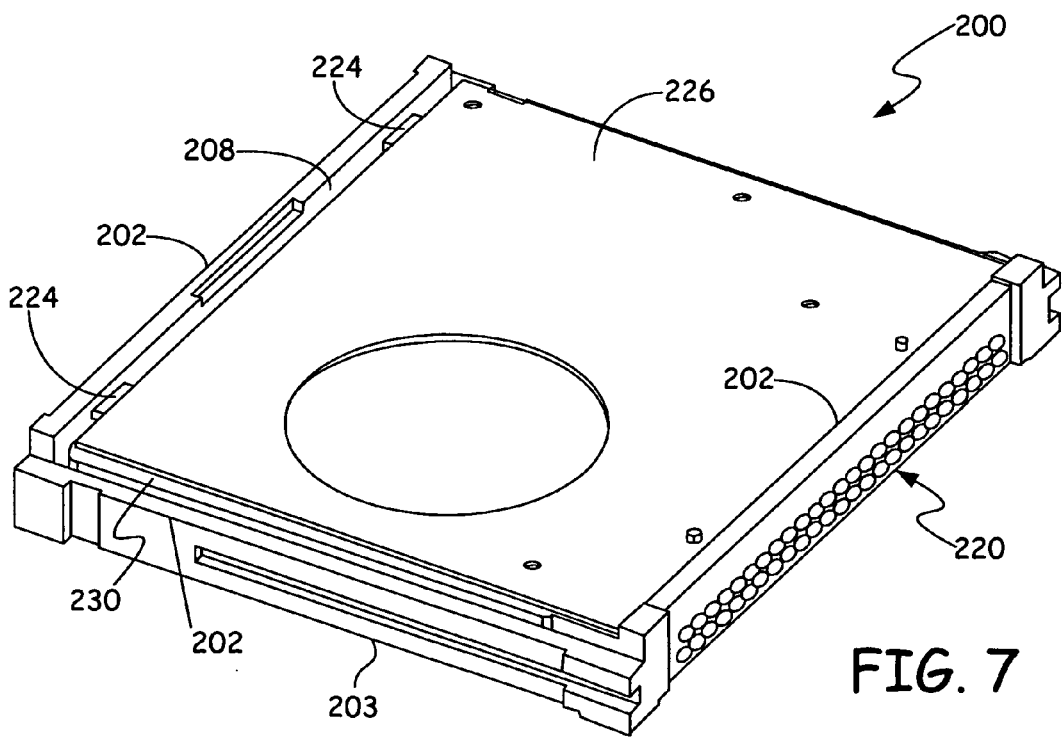
FIG. 7 illustrates a bottom perspective view of the data storage system illustrated in FIG. 6.

FIGS. 6 and 7 illustrate perspective views of a disc drive 200 including an enclosure or HDA 230, PCBA 226 and outer frame 203. FIG. 6 illustrates a top perspective view of disc drive 200, while FIG. 7 illustrates a bottom perspective view of disc drive 200. As illustrated in both FIGS. 6 and 7, enclosure or HDA 230 is positioned above at least one alignment feature 224 and is appropriately aligned with inner surface 208 outer frame 203. At least one alignment feature 224 is clipped between PCBA 226 and enclosure or HDA 230 to prevent outer frame 203 from tilting upwards or downwards relative to the PCBA and the enclosure or HDA. Although not illustrated in FIGS. 6 and 7, disc drive 200 also includes a drive shield and mounting screws (only the screw holes are shown in FIG. 7 for simplicity) such that the above-described components of the data storage system 200 are secured together.

PCBA 226 communicates with components within enclosure or HDA 230 as well as communicates with electrical connector body 220 included in one of the plurality of sidewalls 202. Electrical connector body 220 houses electrical contacts coupled to PCBA 226 and HDA 230 as well as electrical contacts for engaging with electrical contacts in a CF type receiver slot for communication with a host device. Example host devices include consumer electronics like computing device (e.g. personal data assistants), communication devices (e.g. cell phones), audio devices (e.g. digital music players), video recorders (e.g. digital cameras) and etc.

Figure 8:
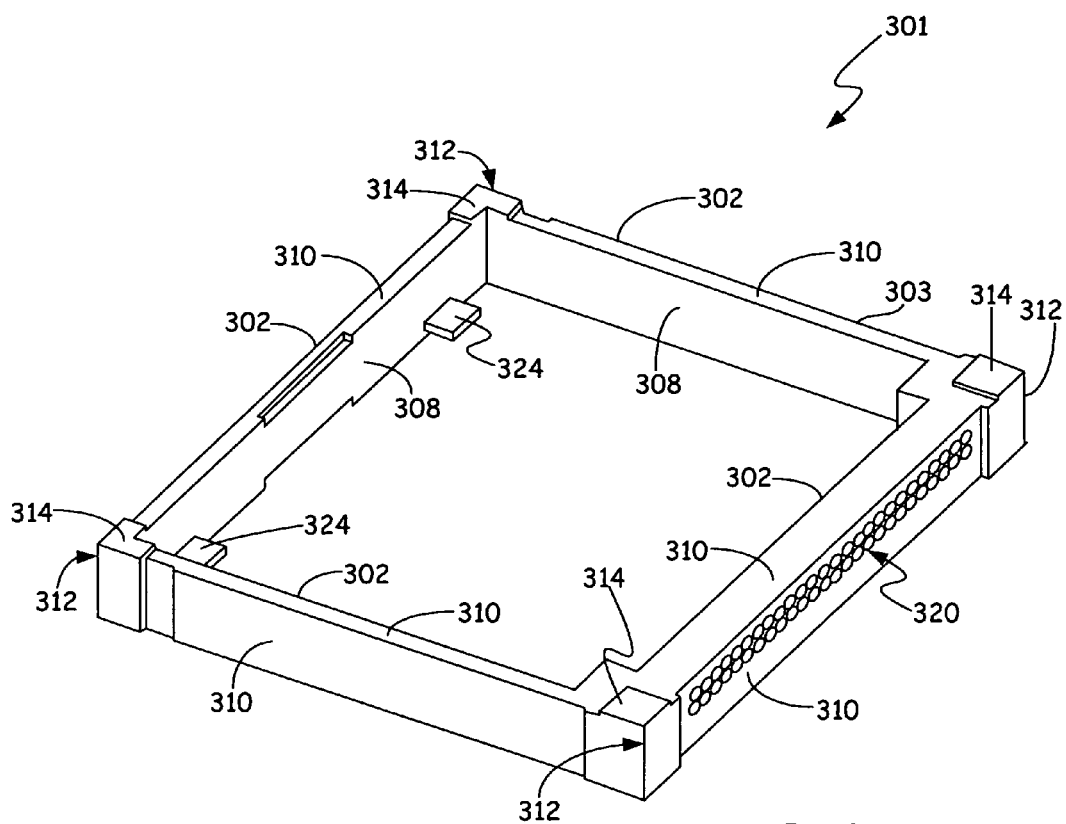
FIG. 8 illustrates a top perspective view of an embodiment of an electrical connector device for use in protecting an enclosure from shock.
Figure 9:
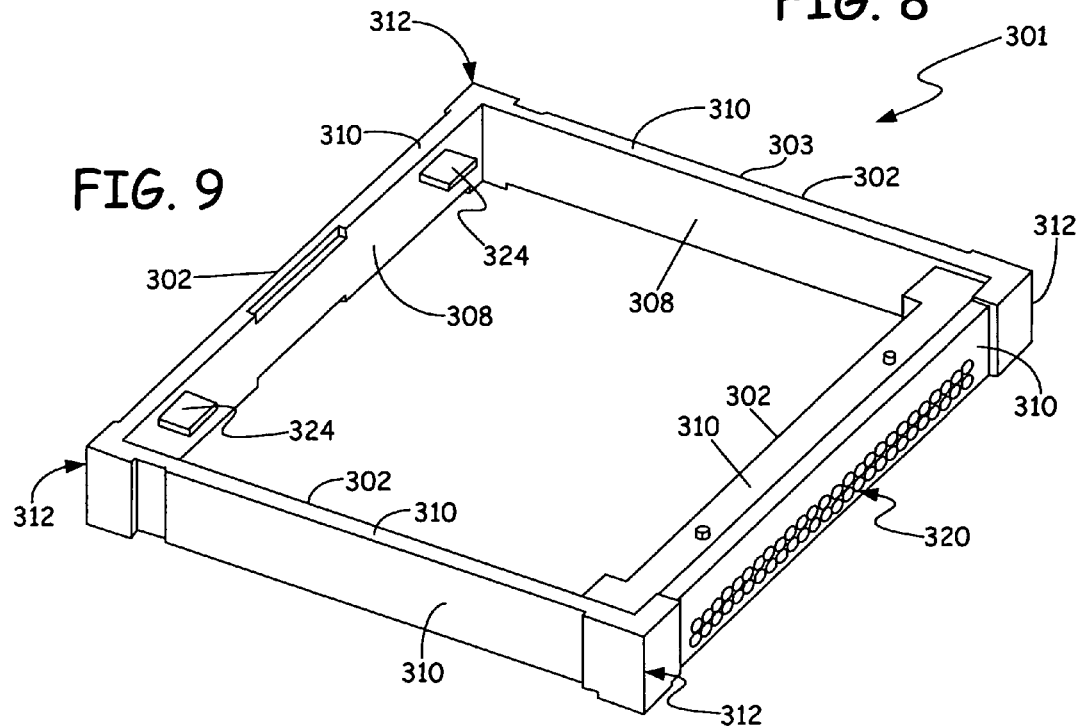
FIG. 9 illustrates a bottom perspective view of the electrical connector device illustrated in FIG. 8.

FIGS. 8 and 9 illustrate perspective views of an electrical connector device 301 for use in protecting an enclosure or HDA from a vibration or shock event in accordance with an embodiment of the present invention. FIG. 8 illustrates a top perspective view of electrical connector device 301, while FIG. 9 illustrates a bottom perspective view of electrical connector device 301. Electrical connector device 301 includes an outer frame 303. Outer frame 303 is configured to at least partially surround a small sized HDA. Outer frame 303 includes an inner surface 308 and an outer surface 310. Inner surface 308 of outer frame 303 is configured to couple adjacent to an enclosure or HDA.

Outer frame 303 also includes a plurality of mutually coupled sidewalls 302. The plurality of mutually coupled sidewalls 302 are configured to absorb shock energy. The plurality of sidewalls 302 are mutually coupled to form four corners 312. In addition to outer frame 303 being able to absorb shock energy, each of the four corners 312 includes a shock bumper 314. Shock bumpers 314 extend outwardly from outer surface 310 of outer frame 303. It should be recognized that shock bumpers 314 can have a shape other than the shape illustrated in FIGS. 8 and 9. Alternative configurations are available. Shock bumpers 314 assist in absorbing shock energy inflicted on the disc drive when the HDA (not shown in FIGS. 8 and 9) is placed under stress. For example, shock absorbing features 314 can absorb shock energy when the HDA is dropped or placed under vibration.

Outer frame 303 also includes an electrical connector body 320 that is included in one of the plurality of sidewalls 302. As illustrated in FIGS. 8 and 9, electrical connector body 320 is integrally formed with outer frame 303 and is positioned between two of the plurality shock bumpers 314 such that there is enhanced protection from damage during a shock or vibration event.

Outer frame 303 also includes at least one alignment feature 324. The at least one alignment feature 324 prevents the outer frame 303 from tilting relative to an enclosure or HDA when the disc drive is assembled. The assembly of the data storage system is described in more detail with respect to FIGS. 10-13.

Figure 10:
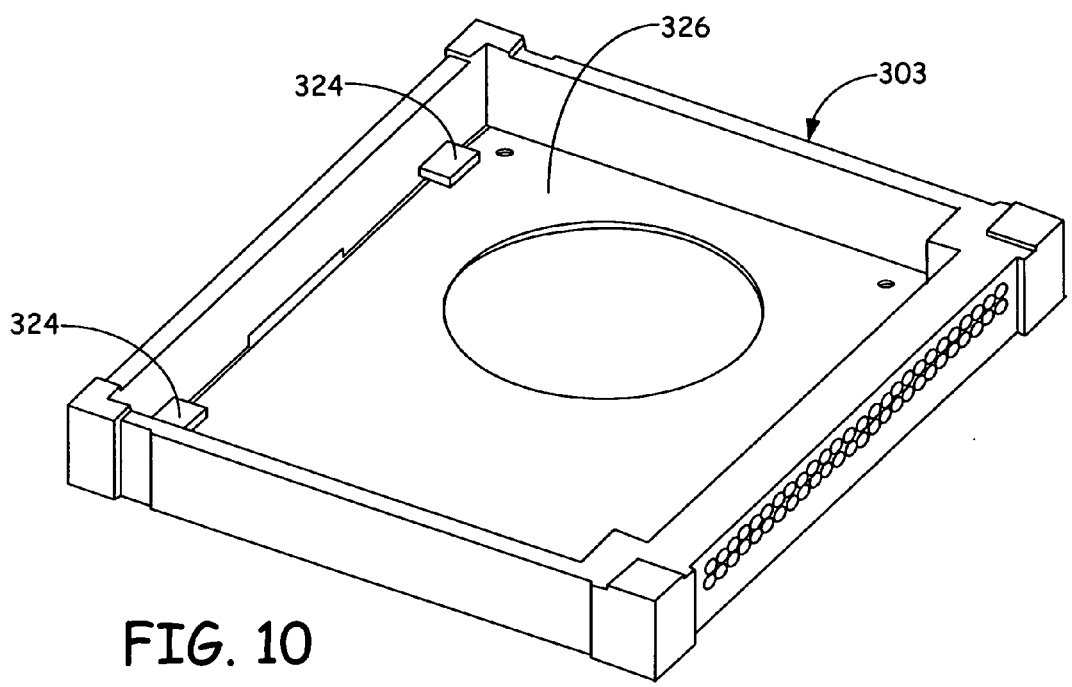
FIG. 10 illustrates a top perspective view of an embodiment of a printed circuit board assembly assembled to the electrical connector device of FIGS. 8 and 9.
Figure 11:
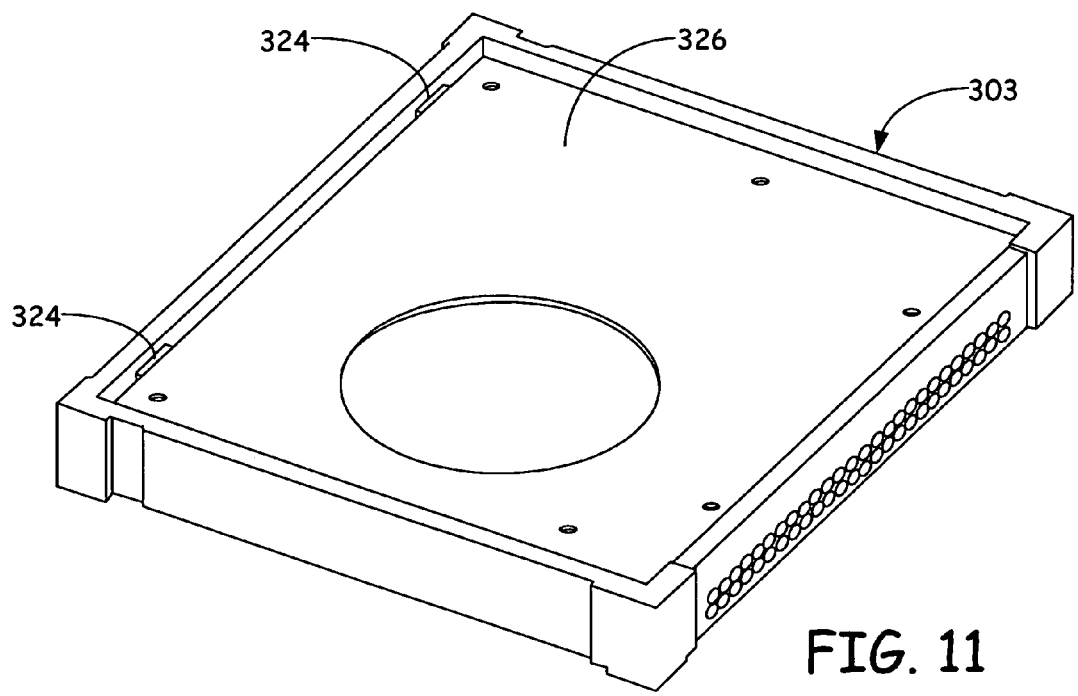
FIG. 11 illustrates a bottom perspective view of the printed circuit board assembly assembled to the electrical connector device illustrated in FIG. 10.

FIGS. 10 and 11 illustrate perspective views of a PCBA 326 assembled to outer frame 303. FIG. 10 illustrates a top perspective view of PCBA 326 assembled to outer frame 303, while FIG. 3 illustrates a bottom perspective view of PCBA 326 assembled to outer frame 303. As illustrated in both FIGS. 10 and 11, PCBA 326 is positioned below at least one alignment feature 324 and is appropriately aligned with outer frame 303 such that the PCBA fits within the outer frame.

Figure 12:
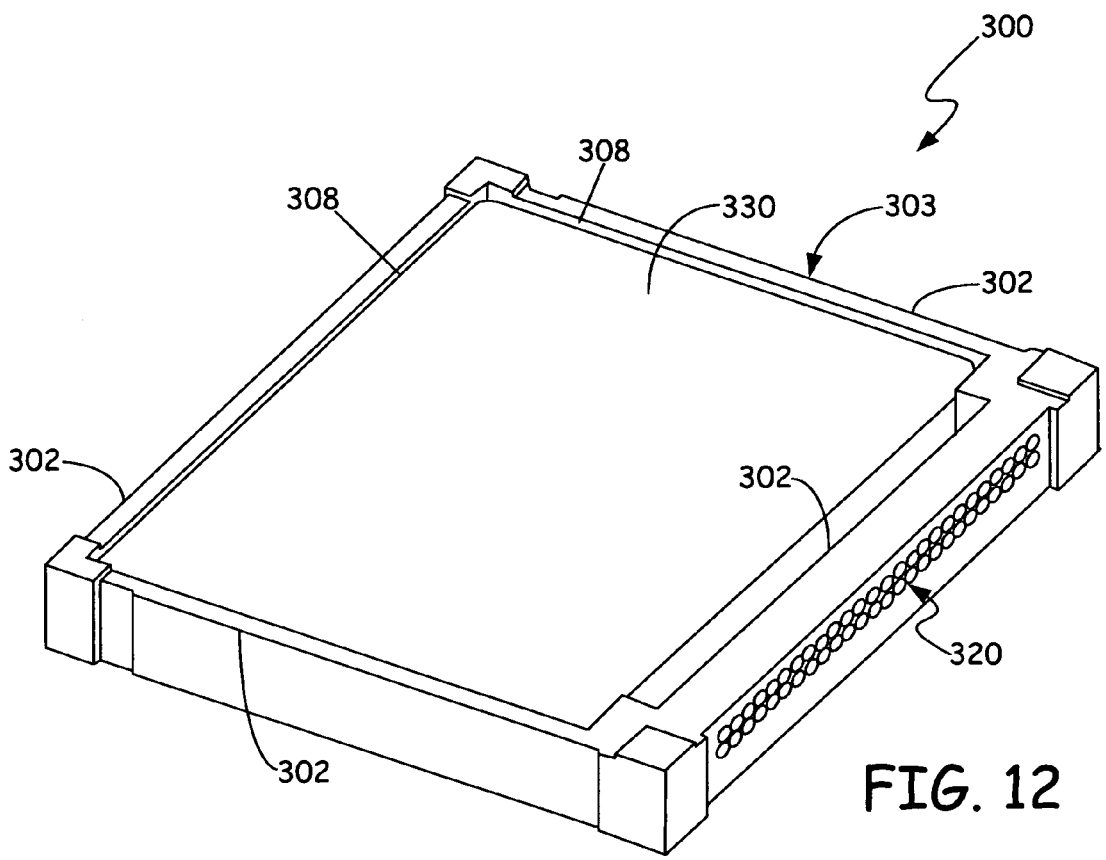
FIG. 12 illustrates a top perspective view of an embodiment of a data storage system.
Figure 13:
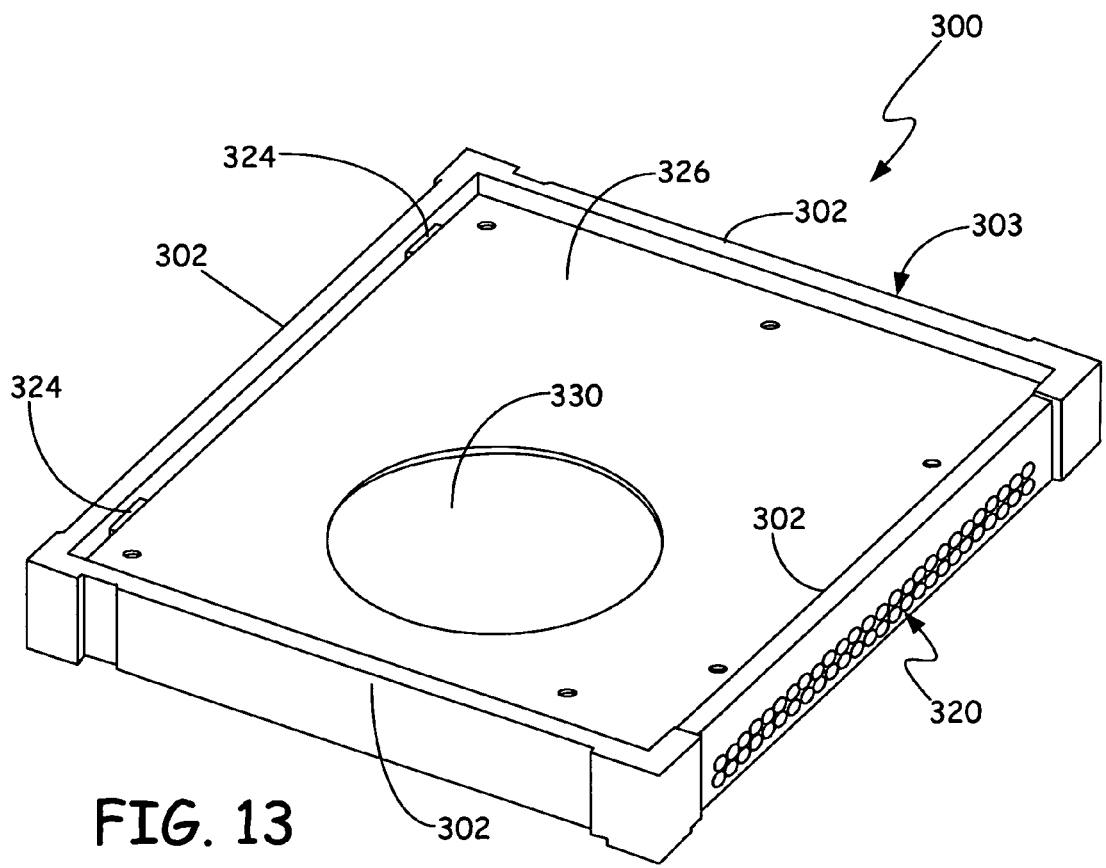
FIG. 13 illustrates a bottom perspective view of the data storage system illustrated in FIG. 12.

FIGS. 12 and 13 illustrate perspective views of a disc drive 300 including an enclosure or HDA 330, PCBA 326 and outer frame 303. FIG. 12 illustrates a top perspective view of disc drive 300, while FIG. 13 illustrates a bottom perspective view of disc drive 300. As illustrated in both FIGS. 12 and 13, enclosure or HDA 330 is positioned above at least one alignment feature 324 and is appropriately aligned with inner surface 308 outer frame 303. At least one alignment feature 324 is clipped between PCBA 326 and enclosure or HDA 330 to prevent outer frame 303 from tilting upwards or downwards from the PCBA and the enclosure or HDA. Although not illustrated in FIGS. 12 and 13, disc drive 300 also includes a drive shield and mounting screws (only the screw holes are illustrated in FIG. 13 for simplicity) such that the above-described components of disc drive 300 are secured together.

PCBA 326 communicates with components within enclosure or HDA 330 as well as communicates with electrical connector body 320 included in one of the plurality of sidewalls 302. Electrical connector body 320 houses electrical contacts coupled to PCBA 326 and HDA 330 as well as electrical contacts for engaging with electrical contacts in a host device.

With reference to FIGS. 2-13 and in one embodiment, electrical connector devices 201, 301 that include outer frames 203, 303, the plurality of mutually coupled sidewalls 202, 302 and electrical connector bodies 220, 320 can be made of a single molded material. Although the single molded material can be made of a polymer, any type of material that has similar properties can be used. In another embodiment, each component of electrical connector devices 201, 301 can comprise different materials. For example, a first material can be used for the shock bumpers 214, 314 of each of the four corners 212, 312, a second material can be used for the plurality of mutually coupled sidewalls 202, 302 and a third material can be used for the integrally formed electrical connector bodies 220, 320. However, it is possible that the plurality of sidewalls 202, 302 can be made of the same material as the electrical connector bodies 220, 320. It is also possible that the shock bumpers 214, 314 can be made of the same material as the sidewalls 202, 302. In general, shock bumpers 214, 314, made of the first material is softer than the second material of sidewalls 202, 302. Example materials include a soft rubber, elastomer, plastic or the like. Sidewalls 202, 302, made of the second material, is softer than the third material of electrical connector bodies 220, 320. In general, electrical connector bodies 220, 320 are made of a harder material that is fire retardant such that it will not get damaged during the process of engaging electrical contacts and disengaging electrical contacts.

Figure 14:
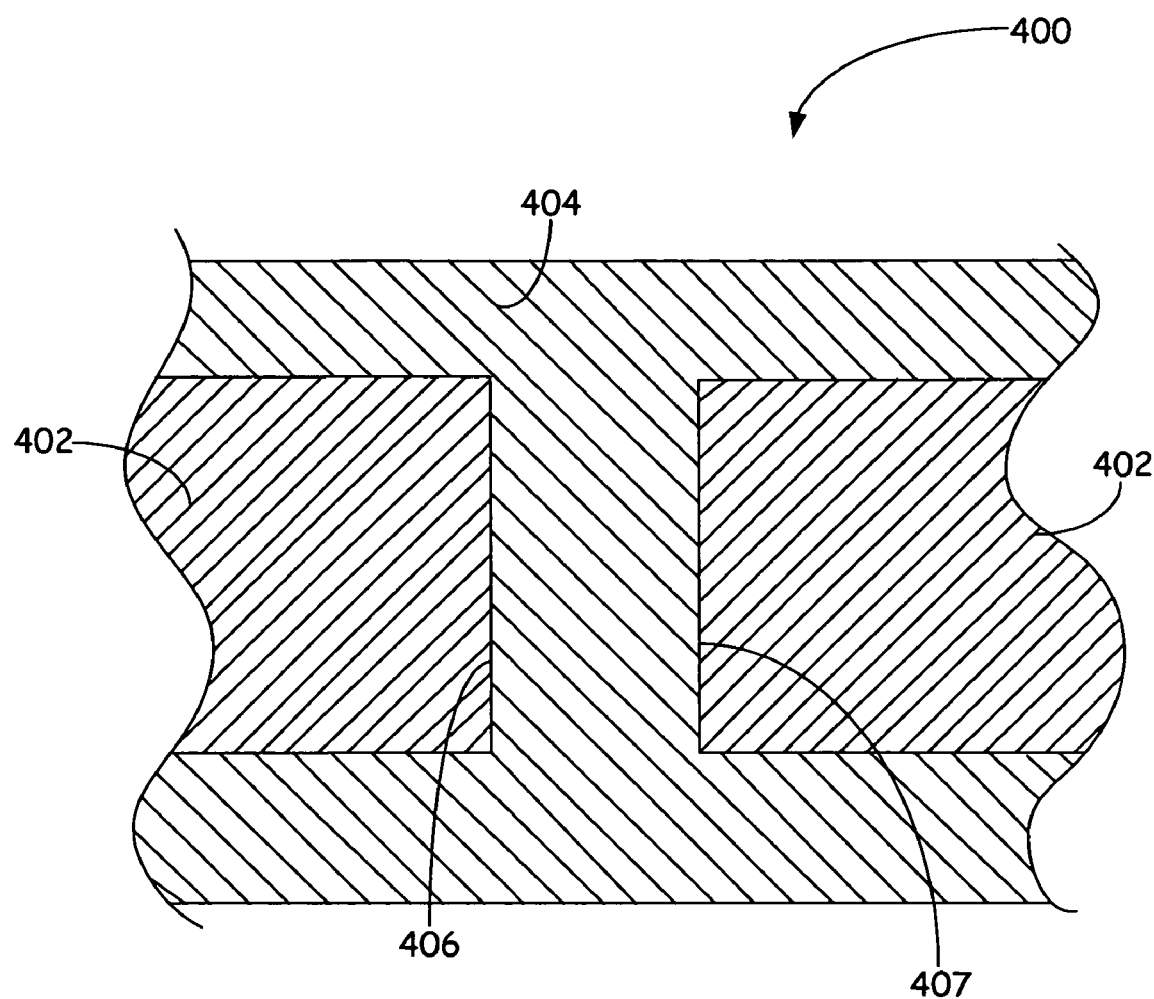
FIG. 14 illustrates a sectional view of an embodiment of a first material coupled to a second material.
Figure 15:
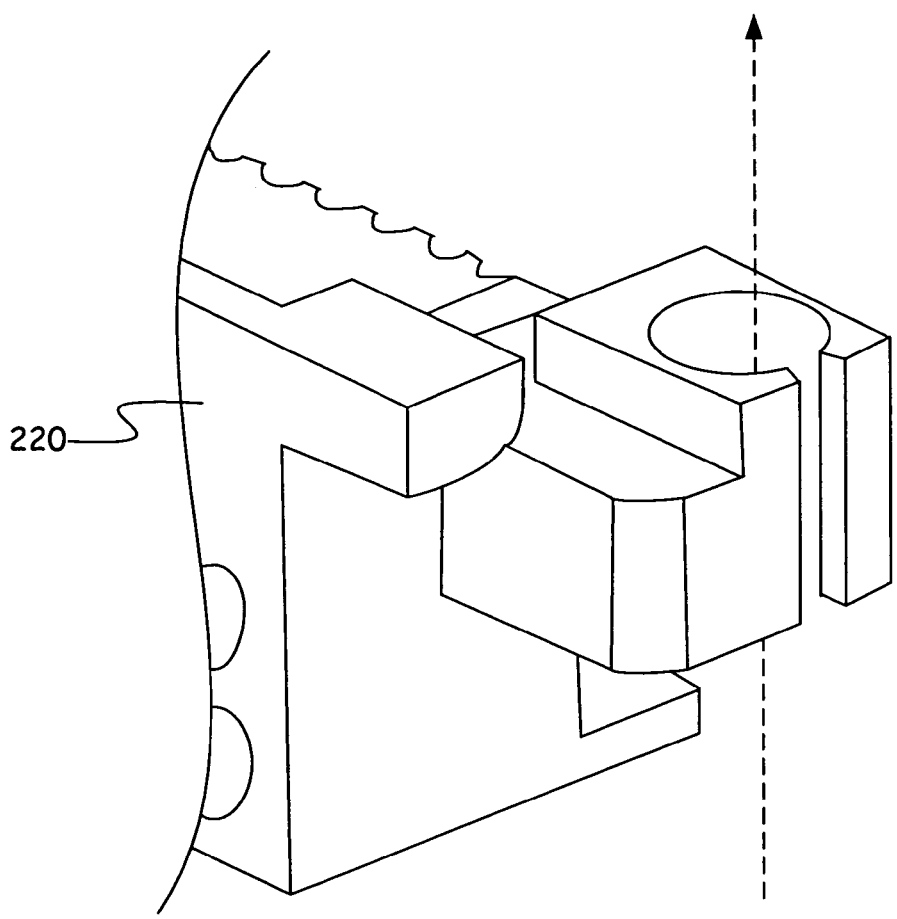
FIG. 15 illustrates a perspective view of an embodiment for integrating an electrical connector with an outer frame.
Figure 15:
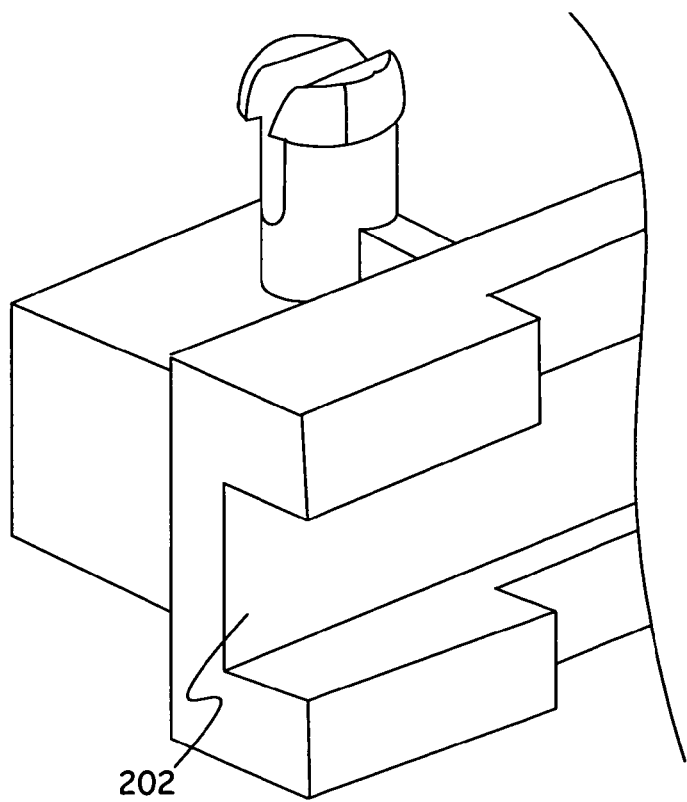

Regardless of how many different materials are used, all of the materials are coupled and integrated together. In one aspect and as illustrated in FIG. 14, the different materials can be molded together. To mold together different materials, interlocking features 400 between a first material 402 and a second material 404 needs to be employed. For example, first material 402 can be sidewalls 202 or 302 of electrical connector device 201 or 301 and second material 404 can be electrical connector body 220 or 320. In FIG. 14, holes 406 and 407 are utilized to form interlocking features 400. Holes 406 and 407 provide an interlocking interface that constrains second material 404 relative to first material 402 in any direction. In another aspect, the different materials can be separately molded and coupled or integrated together using snap fits, heat staking, adhesives (i.e. epoxy glue) or insert molding techniques. FIG. 15 illustrates an example of the integration of electrical connector body 220 or 320 with sidewalls 202 or 302 using a snap fit.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the electrical connector device while maintaining substantially the same functionality without departing from the scope and spirit of the present invention. In addition, although the preferred embodiment described herein is directed to an electrical connector device for a data storage system, it will be appreciated by those skilled in the art that the teachings of the present invention can be applied to other types of hermetically sealed enclosures, without departing from the scope and spirit of the present invention.

What is claimed is:

1. An electrical connector device for an enclosure comprising:
    an outer frame including a plurality of mutually coupled sidewalls, the outer frame having an inner surface configured for coupling adjacent to the enclosure and the plurality of mutually coupled sidewalls form four corners;
    an electrical connector body configured to house electrical contacts for coupling to the enclosure, the electrical connector body included in one of the plurality of sidewalls of the outer frame; and
    a shock bumper formed at each of the four corners that extends outwardly from an outer surface of the outer frame.

2. The electrical connector device of claim 1, wherein the plurality of sidewalls and the electrical connector body are formed in a single mold.

3. The electrical connector device of claim 2, wherein the plurality of sidewalls are formed in the single mold substantially from a first material and the electrical connector body is formed in the single mold substantially from a second material.

4. The electrical connector device of claim 3, wherein the first material and the second material include interlocking features to constrain the second material relative to the first material.

5. The electrical connector device of claim 2, wherein the plurality of sidewalls and the electrical connector body are formed in the single mold substantially from a single material.

6. The electrical connector device of claim 1, wherein the outer frame is configured to mate with a CompactFlash® (CF) Type slot receiver.

7. The electrical connector device of claim 1, wherein the outer frame comprises at least one alignment feature positioned on the inner surface of the outer frame, the at least one alignment feature configured to prevent the enclosure from rotating relative to the outer frame.

8. The electrical connector device of claim 7, wherein the at least one alignment feature extends outwardly from the inner surface of the outer frame.

9. The electrical connector device of claim 1, wherein the enclosure comprises a head disc assembly.

10. The electrical connector device of claim 1, wherein the outer frame comprises at least one handling feature, the at least one handling feature including a notch formed in one of the plurality of sidewalls of the outer frame.

11. A data storage system comprising:
    a head disc assembly;
    a printed circuit board assembly coupled to the head disc assembly;
    an outer frame having an inner surface configured for coupling adjacent to the head disc assembly, the outer frame comprising:
        a plurality of mutually coupled sidewalls configured to mate with a CompactFlash® Type slot receiver; and
        an electrical connector body configured to house electrical contacts for coupling the head disc assembly to a host device in which the slot receiver resides.

12. The data storage system of claim 11, wherein the outer frame comprises a at least one handling feature configured for use in inserting the data storage system into the slot receiver and removing the data storage system from the slot receiver.

13. The data storage system of claim 11, wherein the electrical connector body is integrally formed with one of the plurality of sidewalls of the outer frame by molding the plurality of sidewalls and the electrical connector body together.

14. The data storage system of claim 11, wherein the electrical connector body is integrally formed with one of the plurality of sidewalls of the outer frame by fastening the electrical connector body to one of the plurality of sidewalls.

15. The data storage system of claim 11, wherein the plurality of sidewalls of the outer frame form four corners, each of the four corners including a shock bumper that extends outwardly from an outer surface of the outer frame.

16. The data storage system of claim 15, wherein the shock bumpers comprise substantially a first material, the plurality of sidewalls comprise substantially a second material and the electrical connector body comprises substantially a third material, the first material, second material and third material are molded together and include interlocking features that constrain the shock bumpers relative to the plurality of sidewalls and the electrical connector body relative to the plurality of sidewalls.

17. The data storage system of claim 16, wherein the first material comprises a softer material than the second material and wherein the second material comprises a softer material than the third material.

18. An electrical connector device for an enclosure comprising:
   an outer frame including a plurality of mutually coupled sidewalls, the outer frame configured to at least partially surround the enclosure; and
   an electrical connector body in one of the plurality of sidewalls of the outer frame, the electrical connector body configured to house electrical contacts for coupling the enclosure to a host device; and
   at least one shock absorbing device coupled to the outer frame and extending outwardly from an outer surface of the outer frame.

19. The electrical connector device of claim 18, wherein the enclosure comprises a head disc assembly.

* * * * *